(12) United States Patent
Franchi

(10) Patent No.: US 7,886,156 B2
(45) Date of Patent: Feb. 8, 2011

(54) SECURE UNIVERSAL TRANSACTION SYSTEM

(76) Inventor: John Franco Franchi, 39 Plater Dr., Oxford, Oxfordshire OX26QT (GB)

( * ) Notice: Subject to any disclaimer, the term of this patent is extended or adjusted under 35 U.S.C. 154(b) by 1178 days.

(21) Appl. No.: 11/532,580

(22) Filed: Sep. 18, 2006

(65) Prior Publication Data

US 2008/0072064 A1 Mar. 20, 2008

(51) Int. Cl.
*G06F 21/00* (2006.01)
(52) U.S. Cl. ..................................... 713/186
(58) Field of Classification Search ................ 713/186
See application file for complete search history.

(56) References Cited

U.S. PATENT DOCUMENTS

| 5,055,662 | A | 10/1991 | Hasegawa |
| 5,359,183 | A | 10/1994 | Skodlar |
| 5,870,723 | A | 2/1999 | Pare, Jr. et al. |
| 6,219,439 | B1 | 4/2001 | Burger |
| 6,629,591 | B1 | 10/2003 | Griswold et al. |
| 2003/0009392 | A1* | 1/2003 | Perkowski ................... 705/26 |
| 2003/0159044 | A1 | 8/2003 | Doyle et al. |
| 2004/0041019 | A1 | 3/2004 | Schneider et al. |
| 2004/0188519 | A1 | 9/2004 | Cassone |
| 2004/0234117 | A1* | 11/2004 | Tibor .......................... 382/137 |
| 2005/0154904 | A1* | 7/2005 | Perepa et al. ................ 713/193 |
| 2005/0160298 | A1* | 7/2005 | Reno ............................ 713/202 |
| 2006/0167784 | A1 | 7/2006 | Hoffberg |
| 2007/0045399 | A1 | 3/2007 | Martin |

FOREIGN PATENT DOCUMENTS

| DE | 19631557 A1 | 2/1998 |
| EP | 1028398 A2 | 8/2000 |
| EP | 1170704 A1 | 1/2002 |
| EP | 1396779 A2 | 3/2004 |
| GB | 2331825 A1 | 6/1999 |
| GB | 2401462 A | 11/2004 |
| GB | 2401822 A | 11/2004 |

(Continued)

*Primary Examiner*—Kambiz Zand
*Assistant Examiner*—Teshome Hailu
(74) *Attorney, Agent, or Firm*—Barnes & Thornburg LLP

(57) ABSTRACT

A secure universal transaction system includes an operations and resource component, at least one communication device for enabling user interaction with the operations and resource component, and a secure token associated with each user of the system. The operations and resource component includes a first biometric security component, a second security component, and a communication component for enabling secure communication between the operations and resource component and at least one network. Each communication device includes a wired or wireless token interface, a biometric reader for enabling a user to input a biometric reading, a wired or wireless communication component for enabling communication between the communication device and the operations and resource component, a user input device, and an output device. Each secure token includes a token security component for generating a security code and a data storage component for storing user data. User access to the operations and resource component is permitted only when the secure token is interfaced with the token interface of the communication device, the biometric reading entered by the user matches a biometric reading associated with the secure token in the biometric security component of the operations and resource component, and the security code generated by the token security component matches a corresponding security code associated with the secure token in the second security component of the operations and resource component.

86 Claims, 8 Drawing Sheets

FOREIGN PATENT DOCUMENTS

| | | |
|---|---|---|
| JP | 2002279375 A | 9/2002 |
| WO | WO 01/31562 A1 | 5/2001 |
| WO | WO 2004/019190 A1 | 3/2004 |
| WO | WO 2005/002105 A1 | 1/2005 |
| WO | WO 2006/014205 A3 | 2/2006 |

* cited by examiner

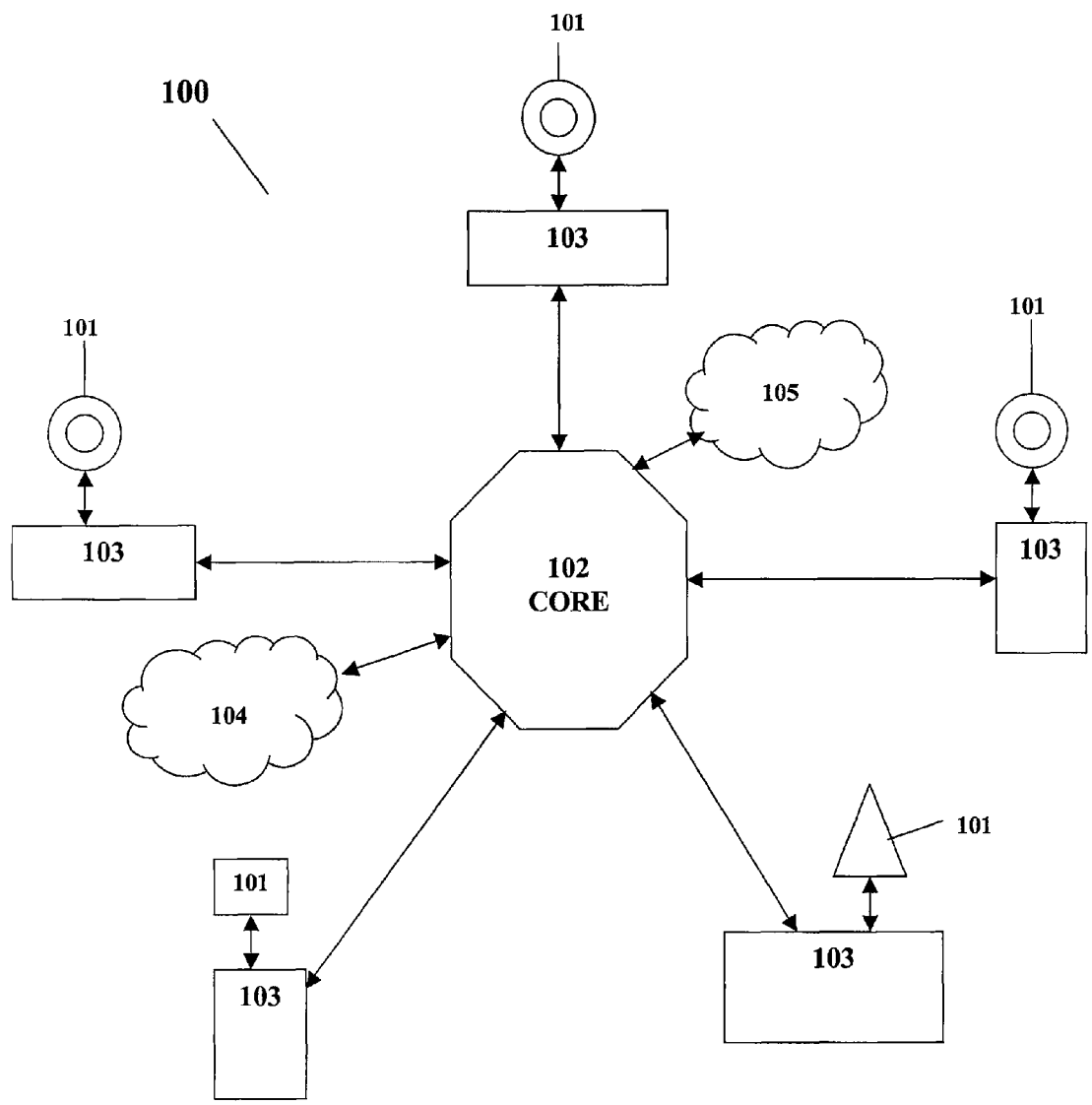

US 7,886,156 B2

SECURE UNIVERSAL TRANSACTION SYSTEM

FIELD OF THE INVENTION

The present invention generally relates to a universal transaction system for performing secure transactions and communications providing unlimited secure data storage, software access, network access, and transaction capabilities with minimal user hardware requirements. The present invention further relates to a communication device and a secure token for use in the secure universal transaction system.

BACKGROUND OF THE INVENTION

As transactions, communication, and other interactions are increasingly performed electronically, the need increases for a secure system for conducting electronic transactions, communications and other interactions that is also convenient for the users and capable of supporting and implementing unlimited types of electronic exchanges, interactions, transactions, and communications as may be desired by the users.

SUMMARY OF THE INVENTION

A secure universal transaction system for implementing secure transactions, communications and other types of electronic interactions includes a secure token or other access device associated with an individual user, a secure operations and resource component, and one or more communication devices that verify the identity of the user using the secure token and a biometric reading and, upon completion of the verification process, enable a user to access the operations and resource center and functionality and information stored in the secure token using the communication device.

The secure universal transaction system may be implemented to provide functionality such as secure instantaneous global money transfers and foreign exchange trading, secure network/Internet access and data exchange, secure electronic and telephone communications of all types, secure transactions such as electronic purchases, live purchases and other financial transactions, an economic valuation search engine and production forecaster, secure voting, secure postal functionality, secure entertainment functionality (including access to gambling, video games, books, music, films, television, etc.), and automatic location-specific advertising and other information (such as travel information, electronic navigation maps and displays, etc.). The secure universal transaction system may also be implemented to provide a universal exchange system using a value exchange unit. The secure universal transaction system further may be implemented to provide other functionality as desired by the users and/or implementers of the system. Users access the system functionality using a communication device enabled by the secure token and a biometric reading.

A secure token for use in the secure universal transaction system may serve as a secure identity device (drivers license, passport, registration card, biometric identity cards, etc.), secure financial device (credit/debit, banking, payment functions), secure storage device (information desired by the user and/or the system, including personal identification information, frequent flyer and loyalty numbers, account information, calendars, contact lists, medical data, network address lists, email address lists, etc.), access device (electronic/magnetic lock release mechanism or key, RF key access systems, password storage device for any system or item that requires a password, including computers, networks, credit card and bank card personal identification numbers, etc.), tracking or locator device (using GPS or any other geographical locating methodology), storage of universal exchange value unit data and transactions, and/or provide any additional functionality as desired by the owner of the secure token and/or the implementer of the system.

A secure universal transaction system includes an operations and resource component having a first biometric security component, a second security component, a communication component for enabling communication between the operations and resource component and at least one network, a processor, and a data storage component; a communication device for enabling user interaction with the operations and resource component, the communication device including a token interface, a biometric reader for enabling a user to input a biometric reading, a communication component for enabling communication between the communication device and the operations and resource component, a user input component to enable the user to input commands and information into the communication device, an output component for providing information to the user, a processor, and a data storage component; and a secure token adapted to interface with the token interface of the communication device, including a token security component for generating a security code, and a data storage component for storing user data. User access to the operations and resource component is permitted only when the secure token is interfaced with the token interface of the communication device, the biometric reading entered by the user matches a biometric reading associated with the secure token in the biometric security component of the operations and resource component, and the security code generated by the token security component matches a corresponding security code associated with the secure token and generated by the second security component of the operations and resource component.

A communication device for use in a secure universal transaction system includes a token interface, a biometric reader for enabling the user to input a biometric reading, a communication component for enabling communication between the communication device and an operations and resource component, a user input component to enable the user to input commands and information into the communication device, an output component for providing information to the user, a processor, and a data storage component. The token interface is adapted to interface with a secure token provided by the user, and wherein user access to the operations and resource component via the communication device is permitted only when the secure token is interfaced with the token interface of the communication device, the biometric reading entered by the user matches a biometric reading associated with the secure token in the operations and resource component, and a security code generated by the secure token matches a corresponding security code associated with the secure token and stored by the operations and resource component.

A secure token for use in a secure universal transaction system having an operations and resource component accessed by at least one communication device includes a token security component for generating a security code and a data storage component for storing user data. User access to the operations and resource component is permitted only when the secure token is interfaced with a token interface of the communication device, a biometric reading entered by the user matches a biometric reading associated with the secure token in a biometric security component of the operations and resource component, and a security code generated by the token security component matches a corresponding security code associated with the secure token and stored by the operations and resource component.

A method for accessing a communication system having an operations and resource component accessed by at least one communication device includes the steps of interfacing a secure token with a communication device; entering a biometric reading into the communication device; transmitting the entered biometric reading from the communication device to the operations and resource component; comparing the entered biometric reading with a biometric reading associated with the secure token in the operations and resource component; when a match is detected between the entered biometric reading and the biometric reading in the operations and resource component, transmitting an access code from the secure token to the operations and resource component via the communication device; and permitting user access to the communication system via the communication device when the access code from the secure token matches a corresponding security code associated with the secure token in the operations and resource component.

These and other features and advantages of the present invention will become apparent to those skilled in the art from the following detailed description, wherein it is shown and described illustrative embodiments of the invention, including best modes contemplated for carrying out the invention. As it will be realized, the invention is capable of modifications in various obvious aspects, all without departing from the spirit and scope of the present invention. Accordingly, the drawings and detailed description are to be regarded as illustrative in nature and not restrictive.

BRIEF DESCRIPTION OF THE DRAWINGS

FIG. 1 provides a diagram of a secure universal transaction system including a secure token for each user, a central operations and resource entity (CORE), and a plurality of communication devices that enable communication between the secure tokens and the CORE.

DETAILED DESCRIPTION

Figure 2A:
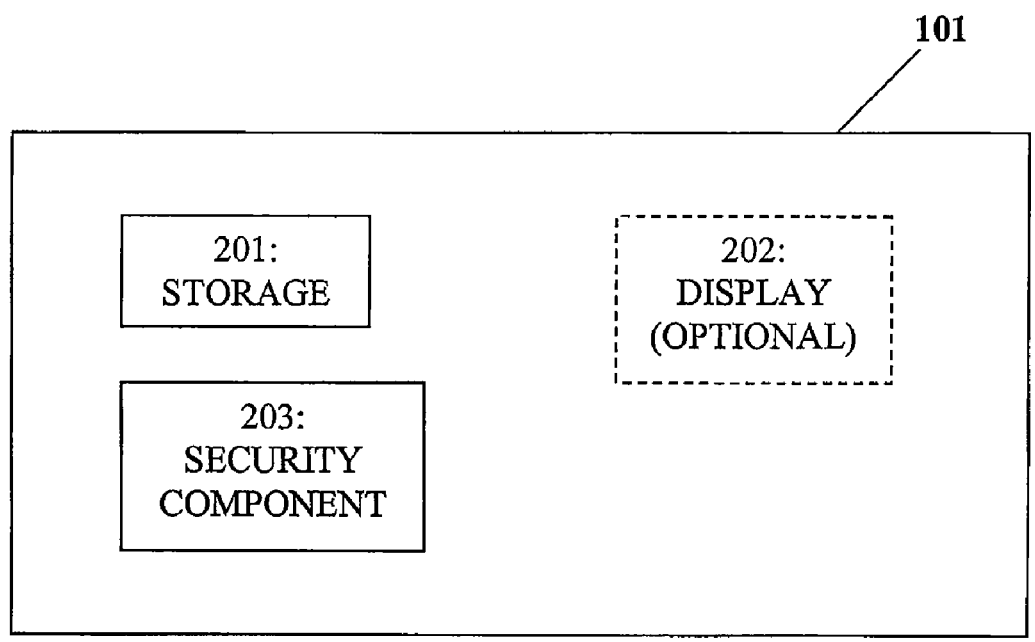
FIGS. 2A-B provide diagrams of a secure token for use in the system in FIG. 1.

As illustrated in FIG. 1, a secure universal transaction system 100 includes a secure token 101 for each user of the system, a central operations and resource entity (CORE) 102, and a communication device 103 (such as a wireless portable communication device) for each user of the system.

Each secure token has an embedded computer chip including a security component such as a processor for implementing a constantly evolving security algorithm, an input device for receiving inputs from the user, and a data storage element. Each secure token may optionally include an LED display screen, as will be described below in more detail with reference to FIGS. 2A-B.

The CORE 102 includes one or more databases or other data storage elements with associated remote redundant backup storage systems, one or more processors, one or more communication devices for enabling all available methods of wired and/or wireless communication between all components of the system 100, including the Internet 104 and other public and/or private networks 105, and a security element for implementing the constantly evolving security algorithm of each secure token 101.

The communication devices 103 may be any type of device having some storage and processing capacity, communication capability, a biometric reader, and an I/O interface for a user. For example, the communication device may be a personal computer, a wireless portable communication devices similar to a portable telephone or PDA, a dummy terminal, public kiosk, or any device capable of receiving a secure token, receiving a biometric reading, enabling communication between the system components, and enabling the user to perform any desired functionality using the communication device 103. Each communication device 103 includes a communication element, such as a telephone, pager, text messaging system, Internet browser, or other communication element; one or more ports (optional) for connecting to wired systems, such as cable ports, telephone ports, network ports, etc., a port or wireless component for receiving/communicating with a secure token 101, and a biometric reader, such as retinal scanner, fingerprint reader, voice recognition system, vein pattern analyzer or any other component that enables biometric identification of the user of the portable communication device 103. Communication devices 103 for use in the system 100 may include, for example, generic units purchased, leased, or otherwise acquired by an individual, and/or provided by entities such as hotels (providing devices for guest use), airlines and other transportation companies (for use while an individual is a passenger), employers, etc., wherein an individual inserts a secure token into the generic device and is able to have access to the CORE 102 and all system functions using the generic communication device in conjunction with the user's secure token.

The system 100 operates as follows. A user inserts his or her secure token 101 into a communication device 103 and also enters a biometric reading, such as retinal scan, fingerprint reading, vein pattern scan or other biometric reading that identifies the user. The communication device 103 transmits the biometric reading to the CORE 102 and performs an encryption and security algorithm identification process with the security component of the CORE 102 (described in detail below with reference to FIG. 4). If the biometric reading matches a reading stored for the user in the CORE 102 and the CORE 102 and the secure token successfully complete the encryption and security algorithm identification process, the user's access to the CORE 102 as well as the data stored on the secure token 101 is enabled. The user may then use the communication device 103 to access the CORE 102 functionality, thereby providing the user with a fully functional computer with virtually unlimited storage capacity, an unlimited range of software access options, as well as access to unlimited communication, transactional, and other functionality as described below in further detail with reference to FIG. 4. All communication between the secure token 101, communication device 103 and the CORE 102 is encrypted. The CORE 102 carries out the functionality requested by the user via the user's communication device 103 and transmits the results to the user's communication device 103 to be displayed to the user and/or stored in the user's secure token 101. When the user has finished using the system 100, the user ends the session with the CORE 102, for example by logging off and removing the secure token 101 from the communication device 103. The communication device 103 is then available for other users using the same process. According to this implementation of the system 100, the communication devices 103 need not store any data associated with the user, but may be facilitators of access to the CORE 102 when enabled by insertion of a valid secure token 101 and accompanying biometric reading.

Figure 2B:
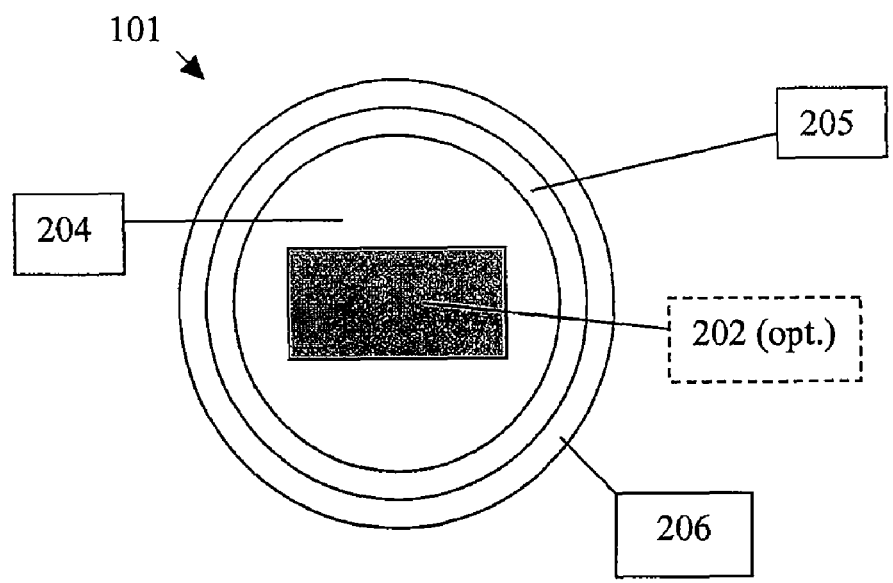

With reference to FIGS. 2A and 2B, a secure token 101 for use in system 100 includes a storage element 201 for storing data associated with the user, an optional display element 202, such as an LED screen or other visual display mechanism, and a security component 203. The data storage element 201 may store any data needed for operation of the system and as desired by the owner of the token 101 who uses the secure token 101 to access the system 100 via one or more communication devices 103, such as personal computers (PCs) or portable communication devices. Data stored in the token may include personal information about the owner of the token, such as personal data (e.g., birth information, address information, identification information, medical data (including patient records, insurance claims and policy information, etc.) and physical description data such as would be included in passports, drivers licenses, social security cards, identity cards, voter registration cards, biometric identity cards, and other types of identification documents), financial data and account information (such as bank account information, credit, debit and/or other account information, available credit balances, etc.), access data such as network user IDs and passwords, credit/debit card and bank card personal identification numbers, and subscriber account information to enable the user to access selected functions, products and services offered via the CORE 102, and any other types of data desired by the owner of the secure token 101 and/or necessary to conduct the transactions or access functionality desired by the owner of the token 101.

The optional display screen 202, for example, and LED display, other electronic display, touch screen, etc., may be provided on the secure token 101 to display any information desired by the token owner, such as token owner identification information, value information, transaction information, or any other type of data as desired by the token owner or the manufacturer/distributor of the token 101. The display screen 202 on the secure token 101 may further provide a safety comparison feature by matching the value on the corresponding account in the CORE 102 with the value on the secure token 103.

A similar safety feature also may be employed on standard credit cards, in which the credit card is provided with a data storage chip and a display screen. The display screen may provide the user with a visual record of all authorized transactions and account information to prevent credit card cloning and fraud. For example, a visual account display enables the user of the credit card to see past purchases and the credit card balance. In the account verification process, if the credit card company's computer balance does not match the user balance stored in the chip on the card when presented for payment in person, the transaction is declined. Telephone, Internet and other transactions where the credit card is not in direct contact with the credit card company computer may be addressed by allowing these remote transactions and subsequently updating the physical card upon first insertion into a physical credit card device, such as a retail location or communication device 103.

The security component 203 of the token 101 is used to identify the token to the CORE 102, and to insure that the token is a valid, recognized token within the system 100. The security component, along with the biometric reading collected by the portable communication device, insures that the user attempting to access the CORE 102 using a communication device 103 and a token 101 is a valid user of the CORE 102 as well as the valid owner of the token 101. This security functionality of component 203 may be accomplished by implementing any number of security protocols between the token security component 203 and the CORE 102 via a communication device 103.

In one embodiment, each token 101 includes a security component 203 containing an evolving algorithm that encrypts all information stored on the token and issues an access password to the CORE 102, thereby acting as a gateway to the CORE 102. Access to the CORE 102 via a communication device 103 is only enabled when a password created by the evolving algorithm is successfully communicated between the security component 203 of the token 101 and a corresponding security component of the CORE 102. The algorithm may be created at the time of creation of the token 101 and installed in both the security component 203 of the token 101 and the corresponding security component of the CORE 102. The security code generated by the encryption algorithm may be, for example, a step-by-step counter identification process such that each password character is transmitted separately to prevent interception of the complete security code. The security algorithm enables encryption of all data stored in the secure token 101, all communication between the secure token 101, the communication device 103 and the CORE 102, and all data stored in the CORE 102.

The algorithm is activated in the security component 203 of token 101 upon insertion of the token 101 into a communication device 103 and subsequent verification of the biometric reading input by the user of the portable communication device 103 and transmitted by the communication device 103 to the CORE 102 for verification. Upon verification of the biometric reading by the CORE 102, the algorithm stored in security component 203 communicates to its matching CORE security component by transmitting an initial access code character, to which the CORE security component responds with a second access code character, to which the security component 203 of token 101 responds with a third access code character, and so on, until a full access code is exchanged between the security components of the token 101 and the CORE 102. The access code may include as many characters as necessary to make it secure, as the access code is not manually entered by the user. Because transmission errors may occur between the CORE 102 and the token 101 inserted into a communication device 103, the system may be designed such that each security component may provide an incorrect character a certain number of times before access will be denied. For example, in one embodiment, failure by either the CORE security component or the token security component 203 to provide the correct access code character more than twice will result in denial of access to the CORE 102. A system check may be performed wherein the CORE 102 and/or the secure token 101 issues one or more incorrect security code characters. Moreover, the evolving algorithm generates a new encryption code and a new CORE access code at every successful access to the CORE 102 by the token 101 via a communication device 103.

Secure tokens 101 for use in the system 100 may be made of any suitable material, such as metal, plastic, composite, etc., and may have any shape, design and form (coin-shaped, rectangular card, etc.) suitable for storing data as described above with reference to data storage element 201 and accessing the CORE 102 via a communication device 103 such as a PC or a portable communication device. Secure tokens 101 may be manufactured to have identifying marks, such as codes or other identifying markings, or may be manufactured to have no identifying markings. Secure tokens 101 may also include a GPS locator or other location monitoring device to enable their location in the event of loss or theft or in emergency situations, or in situations in which a person wants to locate the user of a communication device 103, such as a parent seeking to locate a child. A panic button may also be provided on the communication device 103 to enable the user to send an emergency signal that may be tracked by the locator.

Additional security features may also be included in the secure token 101. For example, a token owner may limit the type and/or value of transactions that may be authorized by the token 101, for example, when a parent provides a secure token 101 to a child or in other situations in which limitations on the use of the secure token are desired. In such situations, security measures may be implemented with multiple access levels for a single secure token 101. For example, in accordance with one implementation, a primary user has unlimited access via the secure token 101, while one or more secondary users have more limited access as defined, e.g., by a transaction value limit or type(s) of access allowed. Thus, when the value or transactions authorized have been used up or accomplished or access limitations exceeded, the secondary user(s) can no longer authorize transactions or access all or designated parts of the system 100 using the secure token 101. The primary user retains full access and can reset or reload the secure token 101 for subsequent use by the secondary user(s).

FIG. 2B depicts an example of a secure token 101 design for use in system 100. In this embodiment, the secure token is constructed in a coin shape having an approximate diameter of 1.5 inches and made of a durable material such as a metal that cannot be accessed without destroying the computer chip. A central coin 204 containing the computer chip (including the data storage element 201 and the security component 203) is provided with an optional LED screen 202. Electrodes to enable contact and electrical communication between the token 101 and a communication device 103 are provided in the form of two concentric rings 205 and 206 that surround the central coin 204. Alternatively, the electrode rings 205 and 206 may be formed as one ring around the central coin 204 on each side of the disk such that both electrodes are exposed side-by-side around the circumference of the token 101 (not shown). In an alternative embodiment, the token 101 communicates wirelessly with the communication device 103, for example, using radio frequency transmissions, such that no electrodes or other physical contact is required between the token 101 and the communication device 103 to enable access to the CORE 102 via the communication device 103.

In the event that a secure token 101 is lost, damaged or stolen, one exemplary protocol includes a security override by biometric input to the CORE 102 as authorized by the owner of the lost/stolen secure token 101, followed by the issuance of a new secure token 101 and new corresponding security component in the CORE 102. In an alternative implementation, a user may be issued two or more secure tokens 101, one of which is provided as a backup that can be activated in the event that the primary secure token is lost, stolen, damaged, etc. In yet another implementation, the owner of the lost secure token 101 must go to a customer service location to obtain a replacement token. Another security feature may be implemented such that repeated entry of incorrect access information, such as a non-matching biometric scan or incorrect password data may result in erasure of the data contained on the secure token 101 or/and permanent disabling of system access using the compromised token.

Figure 3B:
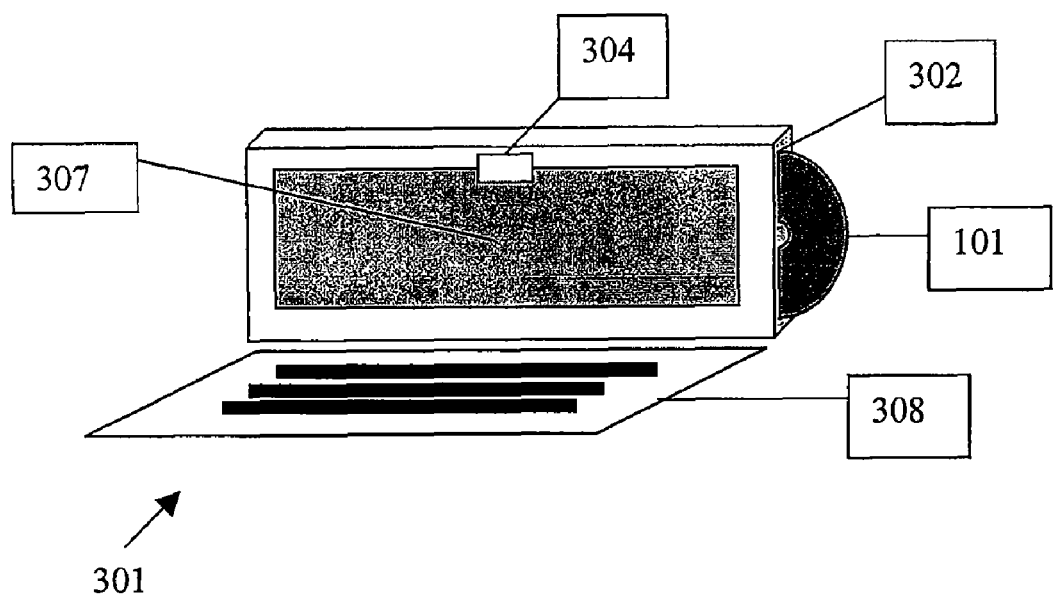
FIGS. 3A-B provide diagrams of a portable communication device for use in the system in FIG. 1.
Figure 3A:
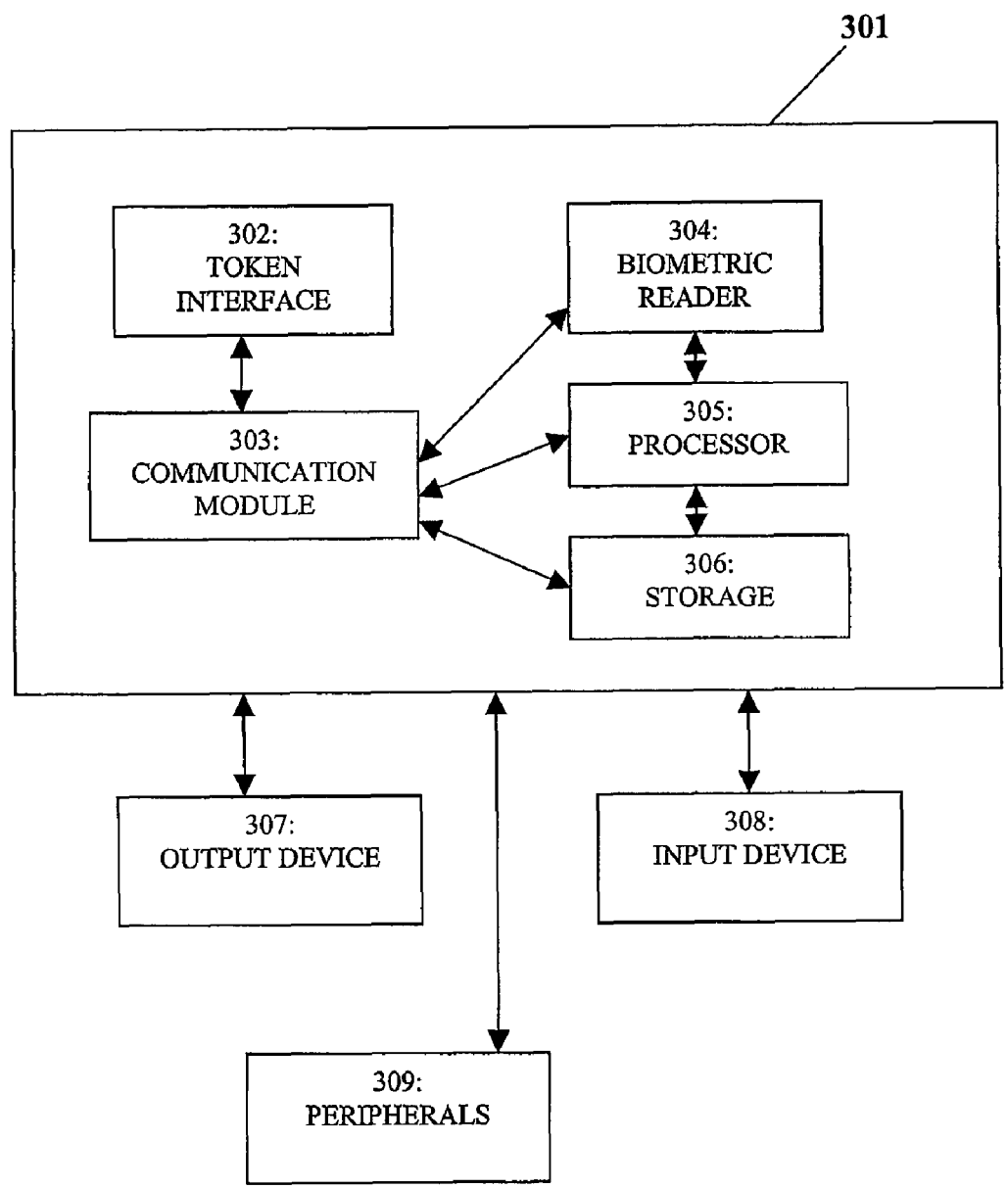

With reference to FIGS. 3A and 3B, a portable communication device 301 for use as a communication device 103 in the system 100 is illustrated in detail. The portable communication device 301 includes a token interface 302 for receiving a secure token 101, a communication module 303 for enabling communications with the CORE 102 and communications with the user of the device 301, a biometric reader 304, a processor 305, a data storage element 306, a display or other data output element 307, a user input device 308, and optional peripheral devices 309 such as speakers, cameras, etc.

The token interface 302 may be any suitable port for receiving a secure token 101 and establishing a connection with the secure token 101 to enable communication between the token 101 and the CORE 102 via the device 301 as well as access to the data stored in the token 101 once security protocols have been satisfied. The token interface 302 may include a physical connection between the token 101 and the device 301 or it may be a wireless interface, such as a radio frequency interface, for enabling access to the data stored in the token 101 and for transmitting data to the token 101 for storage.

The communication module 303 of portable communication device 301 may provide Internet and telephone connectivity using wired and/or wireless connection methods, such as wireless cellular technology, POTS connectivity, cable modem, DSL, WiFi, satellite, or any other method available for communicating between the portable communication device 301 and the CORE 102 and other entities as desired by the user and in accordance with the design of the system 100. For example, in addition to providing CORE access, the portable communication device 301 may also function as a cellular telephone, pager, PDA, text messaging system, and/or provide other functionality as desired by the user. The communication module 303 may also enable Bluetooth® wireless communication technology or other hands-free functionality for the user of the device 301.

The biometric reader 304 may be, for example, a high-resolution digital camera that functions as a retinal scanner, a fingerprint or vein pattern reader or such as an infrared scanner or touchpad, or any other device that enables collection of a biometric reading that may be transmitted to the CORE 102 to verify the identity of the user. One example of a biometric reader is a retinal scanner comprising a camera that issues a movement command generated by the CORE 102, which is visible only to the eye being scanned and is followed by a flash. The movement command provides authentication that the scanned retina is intact, and the flash causes retinal closure to eliminate the use of video or television images that may be used in an attempt to trick the scanner. The movement command may contain an emergency alert movement that will notify authorities in the event that owner of 101 is being coerced to comply whereby designated limited access to 102 is allowed in order not to alert criminals of alarm sequence.

The portable communication device 301 further includes a processor 305 and data storage element 306 to facilitate the operations of the portable communication device 301. Little or no software, programming or long-term data storage capacity is required, as the functionality of the communication device 301 is controlled and implemented by the CORE 102.

The display device 307 may be a display screen (either provided as part of the portable communication device 301 or as a port to enable the user to connect a conventional display screen), printer, scanner, or any other device by which images may be displayed to the user. In one implementation, the display screen may display the value of the last transaction and the user's account balance as a redundant security feature to insure the integrity of the system. An audio output device may also be provided.

The user input device 308 may be a keypad or other data entry device provided as part of the portable communication device 301 or as a port to enable the user to plug in a standard keyboard and mouse, a camera, a touch screen, a touch pen, a voice recognition system with a microphone, or any other device by which the user may enter information into the device 301. Input devices may also include a credit/debit/bank card reader, such as a magnetic card reader or manual entry keypad, that enables a user to enter card account information. The card information may be matched with the biometric reading or other security information to insure that the user of the card is authorized to make payment with the card. The communication device 103 may also automatically contact the card authorization system via the CORE 102 to insure proper authorization for the user's transaction.

Optional peripheral devices 309 may include speakers, game controllers, musical keyboards, and other devices for use in carrying out functions provided by the CORE 102 via the portable communication device 301. Docking systems for the device 301 may also be provided.

An example of a portable communication device 301 is provided in FIG. 3B. The device 301 includes a token interface slot 302 for token 101, an LCD display screen 307, a keyboard and game pad 308, and a digital camera that serves as a retinal scanner 304. The portable communication device illustrated in FIG. 3B may have an approximate size of five inches by two inches by one half inch, or may have any other dimensions or configuration as desired by the user and/or the system implementer.

Figure 4:
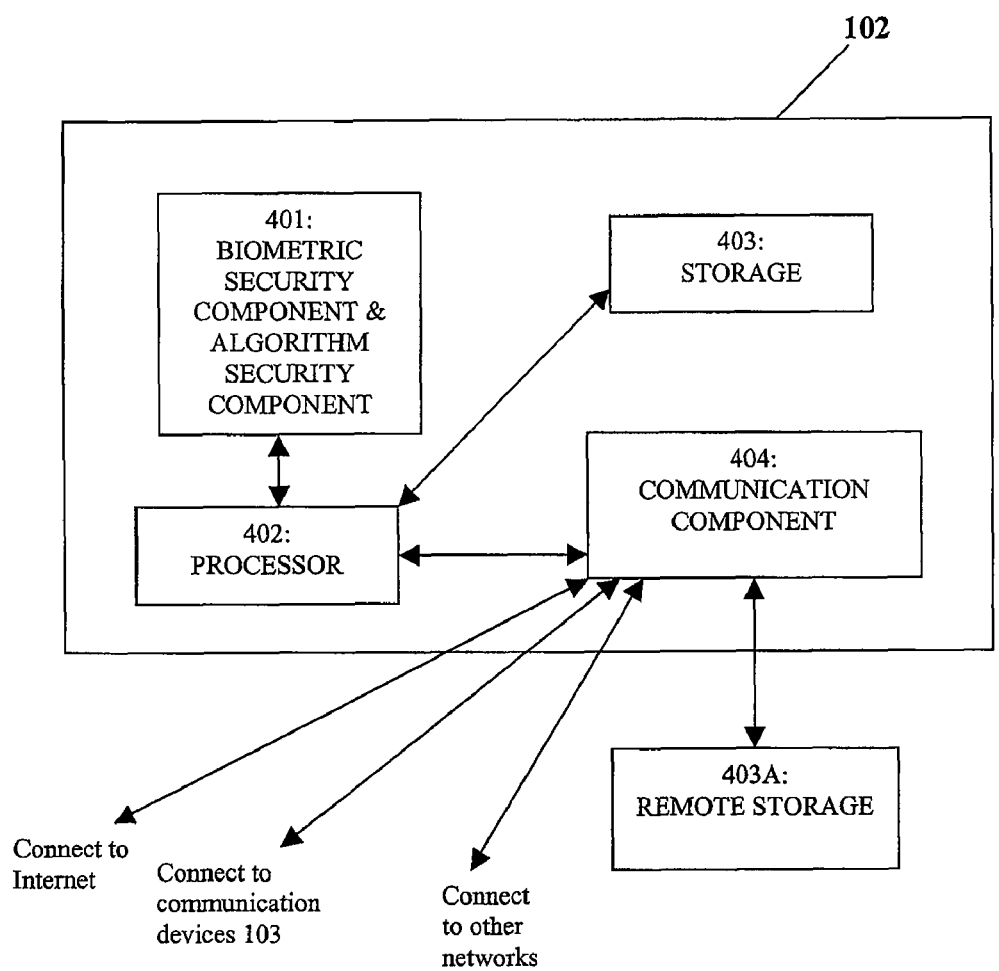
FIG. 4 provides a diagram of a central operations and resource entity (CORE) for use in the system in FIG. 1.

With reference to FIG. 4, a CORE 102 for use in the system 100 may include a security component 401, a processor 402, a data storage element 403 with a remote backup system 403A, and a communications component 404.

The security component 401 may include a processor for implementing a security protocol using an evolving algorithm to match an evolving algorithm stored in each secure token 101 (as described above with reference to FIG. 2A) as well as a biometric reading verification component that receives biometric reading data collected by each communication device 103 in the system 100 and matches the received biometric data with data stored for each system user. The security component may contain a security protocol to isolate all stored data in the system 100 including but not limited to in CORE 102 from direct communication with networks such as 104 and/or 105. This may include employing a security feature which may electronically tag every element, including but not limited to every piece of data and/or program accessing the system 100 so that all interaction between tagged elements is allowed only by manual permission granted.

Figure 6:
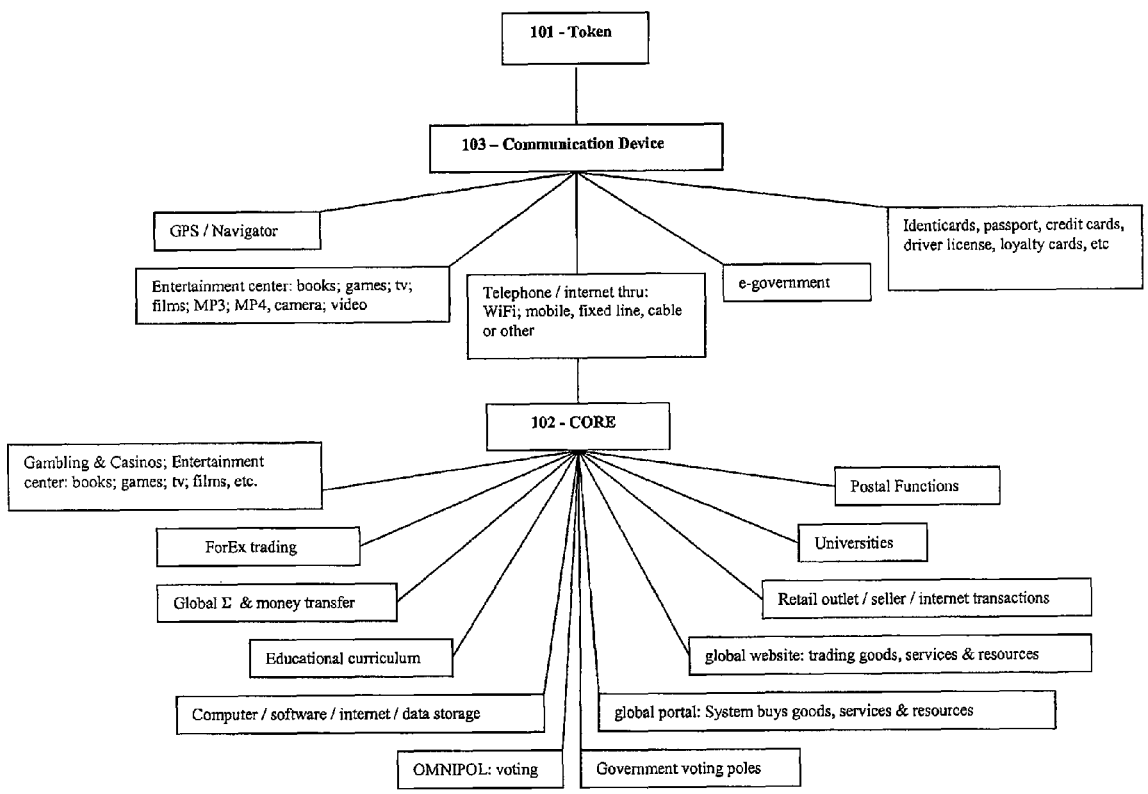
FIG. 6 provides a diagram of possible operations of the system 100 illustrated in FIG. 1.

The processor 402 and data storage components 403 and 403A are used to implement the functionality of the CORE 102 as described below in further detail with reference to FIG. 6.

The communications component 404 of CORE 102 enables communication between the CORE 102, the communication devices 103, the Internet, and any other sources, networks, etc. that CORE users wish to access. The communications component 404 enables all types of wired and wireless communication methods needed to achieve the desired functionality of the system, such as cellular, cable, satellite, RF, WiFi, POTS, and other communication methods.

Notably, the functionality of the CORE 102 may be performed by a central system as illustrated in FIG. 1, a distributed system of networked computers or nodes, or any other architecture that can be used to implement the functionality of the secure universal transaction system described herein.

Figure 5:
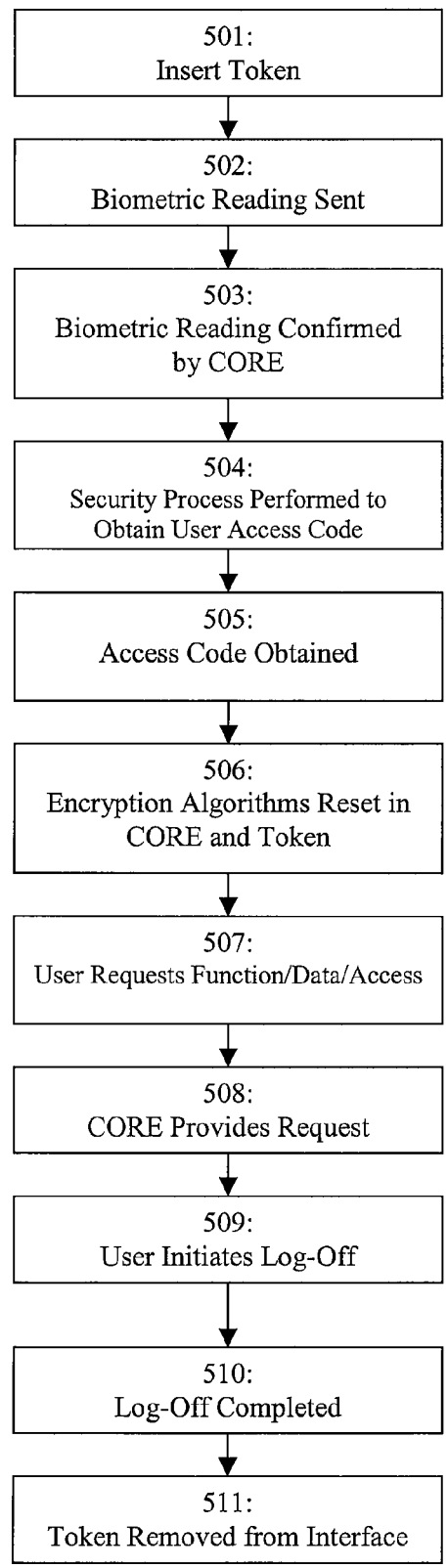
FIG. 5 provides a diagram of an access method conducted by the CORE and a portable communication device in the system in FIG. 1.

FIG. 5 provides a functional block diagram of the communications between the components of the system 100 illustrated in FIG. 1. In step 501, the user inserts a secure token 101 into a communication device 103 (such as device 301). In step 502, in response to a prompt, the user enters a biometric reading such as a retinal scan or fingerprint image, which is transmitted by the communication device 103 to the security component 401 of the CORE 102. In step 503, the security component 403 of the CORE 102 transmits confirmation of the biometric reading to the communication device 103 via communications component 404. In step 504, the security component 203 of the secure token 101 initiates the process of obtaining the access code by communicating with the security component 401 of the CORE 102 via the communication device 103 as described above with reference to FIG. 2A. In step 505, the access code is obtained, user access to the Core 102 functionality is enabled, and the user's CORE session commences. All communications between the CORE 102, the secure token 101 and the communication device 103 are encrypted during the session. In step 506, the identical security algorithm, which is installed in CORE 102 and the secure token 101 independently, is reset in the CORE 102 and the secure token 101 to the identical next step to generate an identical new access code after the user has successfully logged on to the system (i.e., the biometric reading and access code have been successfully input and accepted by the system as described in steps 502-505 above). In step 507, the user transmits a function request to the CORE 102 (for example, a request for access to certain software, a certain service, a certain network site, etc.). In step 508, the CORE 102 accesses the functionality requested by the user and provides it to the user's communication device 103 via the CORE communications component 404. For example, the CORE 102 may download to the communication device 103 software requested by the user, provide access to software programs stored and run within the CORE 102 and enable the user to use the software running in the CORE 102 via the user's communication device 103, or provide a link between the communication device 103 and a network, site or service provider requested by the user. In step 509, the user completes the desired functionality and initiates a log-off process to terminate the CORE session. All data generated or modified by the user during the session with the CORE 102 may be stored in the CORE 102, in the secure token 101, or both, or deleted, as desired by the user and/or in accordance with the operation parameters of the system 100. For example, if the user has utilized a software program and created data (such as a document, file, record, etc.), this data may be stored in the CORE 102, the secure token 101, or both and/or in an external memory device connected to the communication device 103 such as a memory card or other local or remote memory device, for example, a computer accessed directly by the communication device 103 or by the CORE 102 via the communication network, as may be desired by the user to enable access to this data by the user in a subsequent CORE session. In step 510, the user log-off process is completed and the CORE session terminated. In step 511, the user removes the secure token 101 from the communication device 103.

An alternative of the security method illustrated in FIG. 5 is one in which the CORE 102 and the secure token 101 contain the same security algorithm, wherein the algorithm mutually resets to the same step in each device (CORE 102 and secure token 101) when the user logs off and after the last code sequence has been executed. In this method, the access code is not communicated prior to the execution of the final code sequence.

In yet another alternative security method, the CORE security component 401 generates a new access code and encryption algorithm and provides them to the secure token 101 via communication device 103 either upon successful user log-on to the system or upon user log-off.

CORE functionality that may be implemented using a secure universal transaction system (such as system 100) will now be described with reference to FIG. 6. CORE functionality may include one or more of the following, as well as any additional functionality desired by the users and implementers of the system. In some implementations of the secure universal transaction system, fees such as usage, transaction or service fees may be automatically charged by various entities for use of various system functions and/or for access to the information and services provided by the system.

Postal functions: A secure universal transaction system such as system 100 may provide access to conventional postal services, such as access to government postal websites, courier services etc. In addition, in one embodiment of the system 100, postal functionality is provided such that each individual and entity is assigned a unique postal routing code, wherein the entity may access a postal operations center via the CORE 102 and update the physical postal delivery address or delivery information associated with the entity. The entity's routing identity remains the unique postal routing code regardless of the entity's physical delivery address. The user may connect to the postal operations center via the CORE 102 to credit a letter for posting, wherein the postal operations computer issues a unique posting code for the letter, package or other mailing to be scanned by the postal delivery service and automatically debits the user's account (for example, bank or credit/debit account) for the applicable postage cost. The unique posting code may include, for example, the sender's unique postal routing code, the recipient's unique postal routing code, and other identifying digits if necessary. The code may be provided on the mailing by computer, such as through a computer-printed bar code or label or by hand (e.g., written in long-hand or filled out manually in a computer readable format).

For example, a user code 352851 (stored in the postal operations computer as an address for Prometheus Corporation, 9500 Wilshire Boulevard, Beverly Hills, Calif. 90212, USA) and a destination code 039276 (stored as Byron Blake, 301 Park Avenue, New York, N.Y. 10022, USA) may generate a unique posting code 352851039276 (the sender's unique postal routing code plus the recipient's unique postal routing code). If the recipient changes physical address location, he may access the postal operations computer using the system 100 to update his address, and the mailing will be sent to his new location without any change in posting code.

Additionally, in one implementation of a secure universal transaction system such as system 100, the system allows a sender to transmit documents to the postal operations computer or other delivery services for printout and mailing. The secure universal transaction system may be implemented such that a certified hard copy of a document entered and sent by a user of the system via a communication device (e.g., 103) may arrive the same day at any location worldwide. Such a system may be implemented such that the documents are encrypted to prevent access by postal or delivery employees unless such access is allowed by the sender (for digitally recorded and electronic documents). A secure closed-access mechanical printing and packaging system may be provided wherein documents are printed and sealed in delivery packages. Human access to the documents, for example, by postal or delivery employees, is prevented to maintain the confidentiality of the documents. A digital file and record may be generated as proof of delivery, and the sender may access the digital file and record using the communication device (e.g., 103) to obtain verification of delivery. Certification or confirmation of document delivery may also be provided to the sender of the document or other third parties as desired by the sender.

Universities and educational curriculum: A secure universal transaction system such as system 100 in FIG. 1 may facilitate education by storing in the CORE 102 educational software and educational courses produced in conjunction with educational institutes such as schools. institutes, universities, etc. Users may access the educational software and participate in electronic educational studies by accessing the CORE 102 offerings via any communication device 103 using their secure token 101. The CORE 102 may also enable real-time access to educational offering, such as live and pre-recorded video and audio programs, and may further enable a user to obtain educational certification or degrees by taking tests or inputting required information into their communication devices 103 for transmission to the CORE 102 and/or other sites (e.g., a university or other educational Internet or secure network site). The CORE 102 may further facilitate additional security measures in communications between the communication device 103 and the educational entity to insure that the person entering the information into the communication device 103 is the person to whom the test results and other information are correctly attributed. Accordingly, a secure universal transaction system may be used to provide sources of and access to education as well as educational accreditation worldwide regardless of the location of the students or other recipients of information. Moreover, in accordance with one implementation of the secure universal transaction system, the CORE 102 stores and implements or enables access to an online education system provided in conjunction with universities and/or other educational institutes on a worldwide basis such that people have global access to education. Utilizing the global online educational system, students worldwide may access a standardized, flexible, and evolving curriculum that may be accessed by anyone at any level, enabling each individual to progress through the curriculum levels at his or her own pace at any time during their lifetime as they desire.

Retail transactions: A secure universal transaction system such as system 100 may be used to provide worldwide access to unlimited transactions of goods and services via Internet, other network, telephone, or by any remote means. User may use financial information, such as bank account data, credit/debit card information, or any other type of financial information stored in their secure tokens 101 and/or in the CORE 102 to purchase good and services worldwide. The system may further provide confirmation or guarantee of the delivery of purchased goods. For example, the purchase price of ordered goods may be deducted from the buyer's account but not credited to the seller's account until delivery of the purchased goods is verified. In one implementation of the system, a user may scan the barcode or input other identifying markings on a product using a camera on a communication device 103 or otherwise enter product information into a communication device 103 while live on site shopping or in a remote capacity to obtain instantaneous price comparisons with the same and/or similar products offered by other retailers. A GPS or other location device may tailor the price comparison information to the geographic area in which the shopper is located and may further identify/display the location and/or contact information for one or more alternative retailers.

Global web trading and auctioning: The secure universal transaction system may be used to implement a global trading and auctioning system to enable users to post items they wish to trade or sell and buyers or traders to obtain the posted items. The security measures used to access the system (e.g., a biometric scan and password decryption as described above with reference to FIG. 5) as well as the financial data stored in each user's token provide instantaneous secure completion of such transactions. When a user selects an item for trade or purchase, the system may automatically transfer payment information to the seller or automatically debit the buyer's account and credit the seller's account for the transaction amount. The system may also automatically provide shipping or destination information to the seller to enable efficient conveyance of the purchased item(s) to the buyer. The buyer may store in his/her secure token 101 any contact, shipping, and destination data that the buyer wishes to have provided to the seller by the CORE 102. Destination information stored in the secure token 101 and automatically transmitted to the seller by the CORE 102 may be conventional address information, postal routing codes as described above, or any other destination or shipping data input by the user. The system may further provide confirmation or guarantee of the delivery of purchased items. For example, the purchase price of ordered items may be deducted from the buyer's account but not credited to the seller's account until delivery of the purchased items is verified. Furthermore, items to be traded may be verified by a system camera including an authentication time/date stamp as well as a seller's stamp that serves as the seller's certification of the items.

Governmental functions and voting: The secure universal transaction system may be implemented to provide secure access to governmental functions and voting. For example, government issued items, such as drivers licenses, biometric identity cards, passports, voter registration cards, etc. may be remotely and instantaneously renewed from any location worldwide using the system by accessing the appropriate network site via the CORE 102, entering or accessing from the user's secure token 101 the required user information, submitting a digital photograph and/or other biometric data instantaneously through the system, and paying any required fees using financial information retrieved from the user's secure token 101. The license, passport, or other registration information is automatically uploaded into the user's secure token 101 for access by authorized agencies, such as police, customs agents, and officials from any governmental or international agencies. Tax refund or payments, pension and/or social security payments and any other payments to or from the user may be remotely and instantaneously transacted from any location worldwide using the system by accessing the appropriate network site via the CORE 102 utilizing the system 100. Moreover, the user may have worldwide secure access to online local and national voting, census polling, postal services (as described above) and other types of government services made possible by the secure personal verification and encryption security features of the system.

Software and data storage: The secure universal transaction system provides unlimited software and data storage capabilities, as the CORE 102 may be implemented either as a central system or a distributed system and provided with as much memory and data storage facilities as needed. The system may be designed such that the CORE 102 automatically updates the software, security features, and other features and software of each communication device 103 and/or associated secure token 101 when a communication device accesses the CORE 102. User may select to upload and/or use unlimited software programs by submitting requests to the CORE 102, which either provides the requested software or functionality, or establishes a link to a source of the requested software or functionality. Fees associated with the purchase or use of software programs may be automatically paid by the user using the financial data from the user's secure token 101.

Data stored by the system and accessible by each user via the system, for example, in the CORE 102 and/or distributed storage facilities, is unlimited in both type and quantity, and may include any data desired by the user and/or the system implementer. In one implementation of the system, all data stored by the CORE 102 is also stored in remote backup storage facilities in the event of a system failure.

Secure voice, video, data, Internet and comprehensive electronic communications: The secure universal transaction system may be used for secure communications in any electronic format and/or combination of formats.

Global money transfers, foreign exchange, financial trading, bill payment and other financial transactions: The secure universal transaction system may be implemented to enable instantaneous global transfers of money or other assets from one user or entity to another. For example, a user may select to transfer money to another user, wherein the transferor selects an amount to transfer and a recipient, and the financial information in the transferor's and transferee's secure tokens automatically debit the transferor and credit the transferee. If both parties are not online simultaneously, the CORE 102 stores the transfer until the transferee logs on to the system, at which time the CORE 102 instantaneously completes the transfer to the transferee and updates the financial information in the transferee's secure token 101 and to the financial information that may be contained in the CORE 102.

Foreign exchange transactions, equities trading, bond trading, and all other types of financial trading may also be implemented using the secure universal transaction system, for example, using secure encrypted online trading systems.

Users of the secure universal transaction system may also instantaneously pay outstanding bills or select automatic periodic bill payment, which is implemented by the CORE 102 using the financial data stored in the user's secure token 101. For example, a user may access a website that displays an outstanding bill to be paid. The user may select the pay bill option on the screen, and the CORE 102 will send financial information from the user's secure token 101 to the website to enable instantaneous payment of the bill, wherein the user's financial information is modified to reflect a debit of the bill amount and the financial information of the billing party is automatically credited the outstanding amount. Alternatively, the user may select an automatic periodic bill payment option, wherein the CORE 102 automatically identifies the amount owed to a billing entity on a periodic basis and automatically debits the user and pays the billing entity.

Entertainment: One or more communication devices, e.g., 103, of the secure universal transaction system may be designed to enable a user to access various types of computerized and live entertainment. For example, a communication device may enable a user to gamble electronically or participate in live gambling taking place at a casino or other venue using video technology or live remote electronic gambling technology such as that described in U.S. Pat. No. 5,770,533, entitled "Open Architecture Casino Operating System," which is incorporated herein by reference in its entirety.

The secure universal transaction system may also be implemented such that one or more communication devices, e.g., 103, operate as an entertainment console, enabling the user to download and play live and electronic games, videos, music, books, and other types of entertainment available anywhere in the world via the system.

Global trading using international currency unit: A secure universal trading system such as system 100 illustrated in FIG. 1 may further be used to implement a global trading system that promotes the elimination of poverty through economic development, such as job creation, global trade stimulation and increased production of developing nations. The global trading system generates: greatly increased income; trade; sale of goods and services for both developing and develop nations. The system provides increased purchasing power for domestic buyers, thereby increasing domestic sales; opens new export markets; increases sales tax revenues and increases transportation and shipping revenues for developed nations. It provides indebted nations with a sustainable means of developing economic growth and repaying debts and loans by increasing the production and trade capacity of the developing nations.

The global trading system that may be implemented using the secure universal transaction system is a universal exchange system that enables users to purchase a value exchange unit, referred to herein as a UNEX™ ($\Sigma$) for illustrative purposes (any name may be used), anywhere in the world and exchange the unit in any other location in the world for the same relative value of goods, services and resources. For example, if a 1 liter bottle of a drink costs $\Sigma$1 (one UNEX™ unit) in nation A, a person purchasing $\Sigma$ value units in nation A is able to pay $\Sigma$1 for a 1 liter bottle of that drink anywhere in the world, even if the cost of that drink is greater in the purchase location than it is in nation A. The CORE 102 or processing component of the secure universal transaction system automatically provides value equalization of goods and services globally by sampling an index of items of unequalized value (goods, resources and services for which there are no established international valuation systems or standards, including commodity items for which there is no established global value), services and resources on a national basis for each nation and determining the relative value index for the $\Sigma$ value units in each nation.

When used locally, the $\Sigma$ units represent the local or national currency. The $\Sigma$ units must be either exchanged for goods and services or exchanged for the same value as the purchasing currency.

The $\Sigma$ units may also be insured by an insurance fund maintained by the system.

In the universal exchange system, referred to herein as UNEXSYS™ for illustrative purposes (any name may be used), the UNEX™ value units, $\Sigma$, must be traded for goods or services or exchanged for the same amount of the original national purchasing currency or an equivalent amount of another national currency (as determined by conventional international currency exchange rates). UNEXSYS™ accomplishes this value equalization of $\Sigma$ versus goods on an international basis by trading goods, services and currency world wide to equalize valuations.

The UNEXSYS™ universal exchange system may be established worldwide in order to compensate for international cost differentials by trading in the different national markets optimally on an import-duty-free basis to equalize the value of $\Sigma$. For example, when ten billion dollars in goods in the United States are purchased with $\Sigma$ units originating in a second nation, such as South Africa, this provides an import-duty-free trading credit valued at ten billion US dollars in goods from South Africa to the United States. This method provides a debt relief and repayment system for developing nations by stimulating economic development and producing inherent benefits such as jobs, medical and educational facilities, infrastructure, community services, etc. It also stimulates the market economies of developed nations by creating an optimized new market while providing increased purchasing power for the national population. The national population is able to purchase imported products, not currently being domestically produced, at a low price, thereby freeing capital for other domestically produced goods and services.

Users of UNEXSYS™ may purchase $\Sigma$ value units via the secure universal trading system, for example, system 100, using a communication device 103 activated by a secure token 101 as described in detail above. $\Sigma$ units may also be purchased via the Internet, through a retail outlet, at a UNEXSYS™ center or at any location using a purchase method. The value of the purchased $\Sigma$ units is immediately added to the financial data of the user stored on the user's secure token 101 and in the user's CORE account. The $\Sigma$ units are tradable worldwide for comparable goods and services because the $\Sigma$ units represent goods and services being traded and not national currencies.

In the UNEXSYS™ system as implemented using the secure universal transaction system, the processor or CORE 102 contains programming that determines on a continuous or periodic basis the relative value index for the $\Sigma$ unit for each participating nation by evaluating a comprehensive array of unequalized assets within that nation. The comparative value of these assets in each participating nation is used to calculate an index stored by the CORE 102, that is then used to recalculate the conversion rate to national currencies. The CORE 102 stores this index and uses it to automatically debit and/or credit users' secure tokens when $\Sigma$ transactions are performed, registers the transactions, continuously or periodically analyzes the production capacity for the unequalized assets, and provides a portal or link, for example, an Internet site, for users to buy and sell the unequalized assets available in all participating countries.

The $\Sigma$ units may also be redeemed in countries not participating in the UNEXSYS universal exchange system. In such countries, the $\Sigma$ units may be redeemed for goods, services, and other capital improvements payable in local or national currency. Using the secure universal transaction system as illustrated by system 100, the user's secure token 101 may contain additional financial payment information, such as credit card, debit card, banking cards or accounts, in addition to $\Sigma$ credit information that will be used when merchants do not accept $\Sigma$ units.

In addition to calculating a nation-by-nation valuation index for the $\Sigma$ units, the CORE 102 in system 100 may further analyze the production capacity (present ability to produce goods, services and resources) of each nation in terms of goods, services, and resources of allowable goods, services and resources that may be exported from the producing nation, herein Nation B. These goods, services, and resources are those that may be imported into the nation, herein Nation A, where the $\Sigma$ purchased from the producing nation, Nation B are spent without harm to the domestic economy of Nation A. The allowable value of imports to a first nation, Nation A, from a second nation, Nation B, may also be limited by the value of $\Sigma$ units purchased from Nation B spent in the Nation A.

The purchase price of the $\Sigma$ units through system 100 in one implementation may be determined by the highest conversion rate of $\Sigma$ in the nation where the production capacity of goods/services/resources is available at the time of purchase to enable the $\Sigma$ purchaser to obtain the best rate for the $\Sigma$ units available after the rate of the sale of the last $\Sigma$ unit by the system 100. Also, when increased production capacity of goods/services/resources becomes available in nations with higher conversion rates of Σ than the last sale of Σ units by the system 100, all Σ units purchased at a lower conversion rate appreciate to a higher conversion rate with new buyers being sold units at a rate equal to or lower than the previous buyer. Thus, the value of the Σ units appreciates continuously, making the Σ units a dynamic investment purchase for consumers as well as investors and financial traders, such as foreign exchange traders.

The UNEXSYS™ system, which may be implemented using the secure universal transaction system described above, operates to equalize prices for goods, services and resources in the participating nations. Goods, services and resources initially more expensive in some nations will gradually become equal in price through use of the Σ units to purchase these items, thereby equalizing the economies and subsequently the standard of living between nations worldwide.

Figure 7:
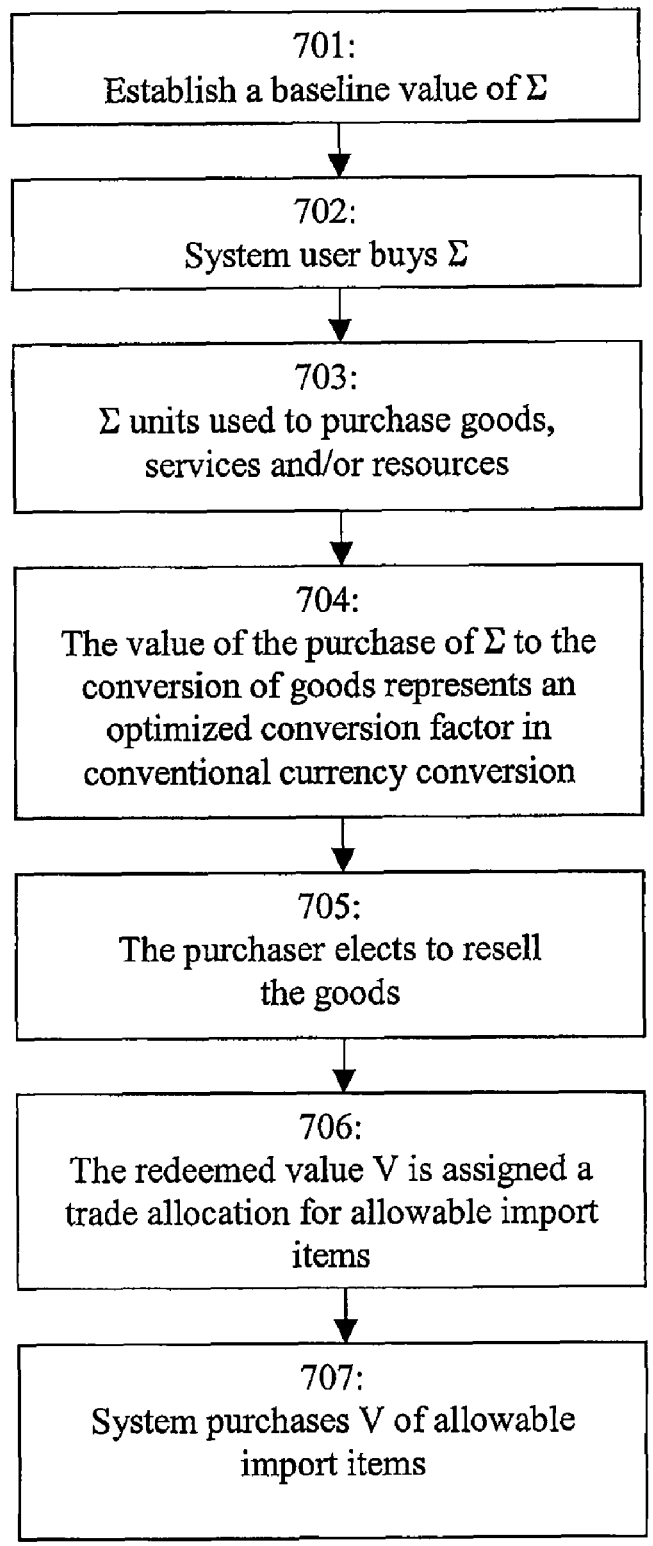
FIG. 7 provides a diagram of the operation of a universal exchange system implemented using a secure universal transaction system, such as the system of FIG. 1.

With reference to FIG. 7, a universal exchange system that may be implemented using a secure universal transaction system such as system 100 in FIG. 1, operates as follows.

In step 701, UNEXSYS establishes a baseline value of Σ in all markets through the analysis of the index of goods, services, and resources on an average national basis.

In step 702, the system user buys Σ from any sales point, which are credited to the buyer, for example by storing the Σ purchase data on the buyer's secure token 101 and CORE 102 account. The visual display on the secure token 101 may provide a safety comparison feature by matching the value on the corresponding account in the CORE 102 with the value on the secure token 101. Buyers of Σ units anywhere in the world are offered the Σ units with the best exchange rate, for example, first buying Σ units issued in nation A (having the least expensive goods, services, and resources), and subsequently buying Σ units issued from increasingly wealthy countries having higher prices for the same goods, services and resources. The value of Σ units available for purchase from each nation is determined and limited based upon the production capacity of export allowable goods, services, and resources in that nation. Thus, the Σ units corresponding to the lowest cost goods (for example, in nation A) are sold first.

In step 703, Σ units are used to purchase goods, services and/or resources in a market selected by the purchaser, for example, in nation B.

In step 704, the value of the purchase of Σ to the conversion of goods from the market of origin of Σ (nation A) to the market of purchase (nation B) represents an optimized conversion factor in conventional currency conversion. For example, a product purchased in the Σ originating in nation A may cost X while the same product in nation B may cost 3×.

In step 705, the purchaser elects to resell the goods purchased in nation B, the purchaser/reseller realizes a net gain, and nation B realizes a net gain of sales tax first from the initial sale of goods then from the resale of the same goods as well as the sales tax from the sale of the allowable import goods equal to the value of Σ spent in that country.

In step 706, the redeemed value V in nation B of the Σ used in nation B but purchased in nation A is assigned as a trade allocation for allowable import items from nation A to nation B.

In step 707, UNEXSYS purchases V of allowable import items in nation A and resells them in nation B in order to cover the costs of the user's purchases in nation B, resulting in increased sales tax revenue in nation B and increased sale of goods in nation A while providing low cost goods not readily available in nation B. This produces a multiplier effect on the domestic purchasing power of citizens of nation B with a net result that citizens of nation B are able to purchase more domestic goods and services, stimulating the economy of nation B, the developed nation. Nation B realizes the benefits of the purchasers from nation A making purchases in nation B. The net result is increased purchases in nations A and B, with increased government tax revenue and economic stimulation for both nations.

From the above description and drawings, it will be understood by those of ordinary skill in the art that the particular embodiments shown and described are for purposes of illustration only and are not intended to limit the scope of the present invention. Those of ordinary skill in the art will recognize that the present invention may be embodied in other specific forms without departing from its spirit or essential characteristics. References to details of particular embodiments are not intended to limit the scope of the invention.

I claim:

1. A secure universal transaction system, comprising:
an operations and resource component, including
a first biometric security component,
a second security component,
a communication component for enabling communication between the operations and resource component and at least one network,
a processor, and
a storage component for storing user function information including a plurality of software applications and data required to enable user access to a plurality of networks and user services;
a communication device for enabling user interaction with the operations and resource component, the communication device including
a token interface,
a biometric reader for enabling a user to input a biometric reading,
a communication component for enabling communication between the communication device and the operations and resource component,
a user input component for inputting user commands and information into the communication device,
an output component for providing information to the user,
a processor, and
a data storage component,
wherein the communication device downloads a customized subset of the stored user function information from the operations and resource component, thereby enabling customized user access to software applications, networks and user services via the communication device, wherein the customized user access includes at least one of download of software requested by the user and access to software programs stored and running on at least one network via the user's communication device; and
a secure token adapted to interface with the token interface of the communication device, including
a token security component for generating a security code, and
a readable and writable data storage component for storing user data including customized system function access data associated with an owner of the token,
wherein user access to the operations and resource component is permitted only when the secure token is interfaced with the token interface of the communication device, the biometric reading entered by the user matches a biometric reading stored in the data storage component of the secure token, and the security code generated by the token security component matches a corresponding security code associated with the secure token in the second security component of the operations and resource component, wherein the customized subset of the stored user function information downloaded from the operations and resource component to the communication device is based upon the customized system function access data stored in the secure token, and wherein the user data stored on the secure token may be modified by the user or the operations and resource component via the communication device.

2. A secure universal transaction system according to claim 1, wherein the operations and resource component is implemented as a centralized computer system.

3. A secure universal transaction system according to claim 1, wherein the operations and resource component is implemented as a network of distributed computer systems.

4. A secure universal transaction system according to claim 1, wherein the biometric reader is a device for obtaining a retinal image and the first biometric security component stores a retinal image associated with the user of the secure token.

5. A secure universal transaction system according to claim 1, wherein the biometric reader is a device for obtaining a digital fingerprint image and the first biometric security component stores a digital fingerprint image associated with the user of the secure token.

6. A secure universal transaction system according to claim 1, wherein the biometric reader is a device for obtaining a vein pattern image and the first biometric security component stores a vein pattern image associated with the user of the secure token.

7. A secure universal transaction system according to claim 1, wherein the biometric reader is a device for obtaining a voice input and the first biometric security component stores voice recognition data associated with the user of the secure token.

8. A secure universal transaction system according to claim 1, wherein all communications between the operations and resource component, the secure token, and the communication device are encrypted.

9. A secure universal transaction system according to claim 1, wherein the second security component of the operations and resource component communicates with the token security component to generate an access code using an evolving encryption or other security algorithm.

10. A secure universal transaction system according to claim 1, wherein each data element stored in the operations and resource component is protected from access via the at least one network by an electronic tag associated with the data element that restricts access to authorized users.

11. A secure universal transaction system according to claim 1, wherein the operations and resource component enables user access to the Internet, at least one public network, or at least one private network via the communication device.

12. A secure universal transaction system according to claim 11, wherein the communication device enables wireless access to the Internet, the public network, or the private network.

13. A secure universal transaction system according to claim 1, wherein the operations and resource component communicates with the communication device using wireless communication technology.

14. A secure universal transaction system according to claim 1, wherein the operations and resource component communicates with the communication device using wired communication technology.

15. A secure universal transaction system according to claim 1, wherein the data storage component of the operations and resource component stores software, data, access links, personal preferences, financial data, or other user data.

16. A secure universal transaction system according to claim 1, wherein the token interface provides an electrical contact through which the secure token provides and receives data from the communication device.

17. A secure universal transaction system according to claim 1, wherein the token interface provides a wireless data interface through which the secure token provides and receives data from the communication device.

18. A secure universal transaction system according to claim 1, wherein the user input component includes a keypad.

19. A secure universal transaction system according to claim 1, wherein the user input component includes a touch screen.

20. A secure universal transaction system according to claim 1, wherein the user input component includes a microphone.

21. A secure universal transaction system according to claim 1, wherein the output component includes a display screen.

22. A secure universal transaction system according to claim 1, wherein the output component includes a printer.

23. A secure universal transaction system according to claim 1, wherein the output component includes an audio speaker.

24. A secure universal transaction system according to claim 1, wherein the secure token is round in shape and includes at least one contact electrode.

25. A secure universal transaction system according to claim 1, wherein the secure token is polygonal in shape.

26. A secure universal transaction system according to claim 1, wherein there are a plurality of communication devices used by a plurality of users to access the operations and resource component.

27. A secure universal transaction system according to claim 26, wherein at least one of the plurality of users is permitted a different level of access to the operations and resource component than the others of the plurality of users.

28. A secure universal transaction system according to claim 1, wherein the communication device includes a locator for identifying the geographical location of the communication device.

29. A secure universal transaction system according to claim 1, wherein the secure token includes a locator for identifying the geographical location of the secure token.

30. A secure universal transaction system according to claim 1, wherein the operations and resource component provides postal functions for users of the system.

31. A secure universal transaction system according to claim 30, wherein the each user is assigned a unique postal routing code, each user provides delivery information that is associated with the user's unique postal routing code, and the operations and resource component accesses the delivery information associated with the user's unique postal routing code to direct mail to the user.

32. A secure universal transaction system according to claim 31, further comprising a document delivery system in which a document to be delivered to a recipient is electronically transmitted to a postal or other outlet servicing the recipient location and printed at the postal or other outlet servicing the recipient location by a secure printing system for delivery to the recipient.

33. A secure universal transaction system according to claim 1, wherein the operations and resource component provides user access to educational software and facilitates user participation in educational courses.

34. A secure universal transaction system according to claim 1, wherein the operations and resource component enables the user to conduct electronic transactions using the communication device.

35. A secure universal transaction system according to claim 34, wherein the operations and resource component enables the user to perform real-time pricing comparisons and obtain retail outlet location information using the communication device.

36. A secure universal transaction system according to claim 34, wherein an item to be purchased via the system has an associated authentication certification created by the communication device of a seller of the item.

37. A secure universal transaction system according to claim 34, wherein a sale amount associated with sale of an item performed via the system by a seller to a buyer is credited to the seller only upon verification of delivery of the item to the buyer.

38. A secure universal transaction system according to claim 1, wherein the operations and resource component enables the user to participate in voting and other governmental functions.

39. A secure universal transaction system according to claim 1, wherein the operations and resource component enables the user to conduct electronic financial transactions using the communication device.

40. A secure universal transaction system according to claim 1, wherein the operations and resource component enables the user to access entertainment activities and products using the communication device.

41. A secure universal transaction system according to claim 1, wherein the operations and resource component provides user access via the communication device to a global trading system, wherein transactions in the global trading system are conducted using an international value unit that has a geographically variable value index based upon valuation of unequalized goods in geographic regions in which the global trading system operates, wherein the operations and resource component generates the geographically variable value index and calculates a regional value of the international value unit in each geographic region in which the global trading system operates, and wherein the international value unit equalizes a value of goods, services, and resources worldwide.

42. A communication device for enabling a user to access a secure universal transaction system, comprising:
a token interface,
a biometric reader for enabling the user to input a biometric reading,
a communication component for enabling communication between the communication device and an operations and resource component, wherein the operations and resource component stores user function information including a plurality of software applications and data required to enable user access to a plurality of networks and user services,
a user input component to enable the user to input commands and information into the communication device,
an output component for providing information to the user,
a processor, and
a data storage component,
wherein the token interface is adapted to interface with a secure token provided by the user such that user access to the operations and resource component via the communication device is permitted only when the secure token is interfaced with the token interface of the communication device, the biometric reading entered by the user matches a biometric reading stored on the secure token, and a security code generated by the secure token matches a corresponding security code associated with the secure token in the operations and resource component,
wherein the secure token stores customized system function access data associated with an owner of the token, and
wherein the communication device downloads a customized subset of the stored user function information from the operations and resource component based upon the customized system function access data stored on the secure token, thereby enabling customized user access to software applications, networks and user services via the communication device, wherein the customized user access includes at least one of download of software requested by the user and access to software programs stored and running on at least one network via the user's communication device.

43. A communication device according to claim 42, wherein the biometric reader is a device for obtaining a retinal image and the biometric reading associated with the secure token is a retinal image.

44. A communication device according to claim 42, wherein the biometric reader is a device for obtaining a digital fingerprint image and the biometric reading associated with the secure token is a digital fingerprint image.

45. A communication device according to claim 42, wherein the biometric reader is a device for obtaining a vein pattern image and the biometric reading associated with the secure token is a vein pattern image.

46. A communication device according to claim 42, wherein the biometric reader is a device for obtaining a voice input and the biometric reading associated with the secure token is stored voice recognition data.

47. A communication device according to claim 42, wherein the operations and resource component enables user access to the Internet, at least one public network, or at least one private network via the communication device.

48. A communication device according to claim 42, wherein the communication device enables wireless access to the Internet, the public network, or the private network.

49. A communication device according to claim 42, wherein the operations and resource component communicates with the communication device using wireless communication technology.

50. A communication device according to claim 42, wherein the operations and resource component communicates with the communication device using wired communication technology.

51. A communication device according to claim 42, wherein the token interface provides an electrical contact through which the secure token provides and receives data from the communication device.

52. A communication device according to claim 42, wherein the token interface provides a wireless data interface through which the secure token provides and receives data from the communication device.

53. A communication device according to claim 42, wherein the user input component includes a keypad.

54. A communication device according to claim 42, wherein the user input component includes a touch screen.

55. A communication device according to claim 42, wherein the user input component includes a microphone.

56. A communication device according to claim 42, wherein the output component includes a display screen.

57. A communication device according to claim 42, wherein the output component includes a printer.

58. A communication device according to claim 42, wherein the output component includes an audio speaker.

59. A communication device according to claim 42, wherein the communication device enables user access to postal functions via the operations and resource component.

60. A communication device according to claim 59, wherein the each user is assigned a unique postal routing code, each user provides delivery information that is associated with the user's unique postal routing code, and the operations and resource component accesses the delivery information associated with the user's unique postal routing code to direct mail to the user.

61. A communication device according to claim 60, wherein the communication device provides access to a document delivery system in which a document to be delivered to a postal or other outlet servicing the recipient is electronically transmitted to a recipient location and printed at the postal or other outlet servicing the recipient location for delivery by a secure printing system to the recipient.

62. A communication device according to claim 42, wherein the communication device enables user access to educational software and facilitates user participation in educational courses via the operations and resource component.

63. A communication device according to claim 42, wherein the communication device enables the user to conduct electronic transactions via the operations and resource component.

64. A communication device according to claim 63, wherein the communication device enables the user to perform real-time pricing comparisons and obtain retail outlet location information via the operations and resource component.

65. A communication device according to claim 63, wherein an item to be purchased via the secure universal transaction system has an associated authentication certification created by the communication device of a seller of the item.

66. A communication device according to claim 63, wherein a sale amount associated with sale of an item performed via the secure universal transaction system by a seller to a buyer is debited from the buyer and confirmed to the seller immediately upon completion of the sale and credited to the seller only upon verification of delivery of the item to the buyer.

67. A communication device according to claim 42, wherein the communication device enables the user to participate in voting and other governmental functions via the operations and resource component.

68. A communication device according to claim 42, wherein the communication device enables the user to conduct electronic financial transactions via the operations and resource component.

69. A communication device according to claim 42, wherein the communication device enables the user to access entertainment activities and products.

70. A communication device according to claim 42, wherein the communication device enables the user to access a global trading system, wherein transactions in the global trading system are conducted using an international value unit that has a geographically variable value index based upon valuation of unequalized goods in geographic regions in which the global trading system operates, and wherein the operations and resource component generates the geographically variable value index and calculates a regional value of the international value unit in each geographic region in which the global trading system operates.

71. A communication device according to claim 42, wherein the communication device includes a locator for identifying the geographical location of the communication device.

72. A secure token for use in a secure universal transaction system having an operations and resource component accessed by at least one communication device, the secure token comprising:
    a token security component for generating a security code, and
    a readable and writable data storage component for storing user data including customized system function access data associated with an owner of the token,
    wherein user access to the operations and resource component is permitted only when the secure token is interfaced with a token interface of the communication device, a biometric reading entered by the user matches a biometric reading stored in the data storage component of the secure token, and a security code generated by the token security component matches a corresponding security code associated with the secure token in the operations and resource component,
    wherein the operations and resource component stores user function information including a plurality of software applications and data required to enable user access to a plurality of networks and user services, and
    wherein the communication device downloads a customized subset of the stored user function information from the operations and resource component based upon the customized system function access data stored on the secure token, thereby enabling customized user access to software applications, networks and user services via the communication device, wherein the customized user access includes at least one of download of software requested by the user and access to software programs stored and running on at least one network via the user's communication device.

73. A secure token according to claim 72, wherein the secure token is round in shape and includes at least one contact electrode.

74. A secure token according to claim 72, wherein the secure token provides and receives data from the communication device through a wireless interface.

75. A secure token according to claim 72, wherein the secure token is polygonal in shape.

76. A secure token according to claim 72, wherein the secure token includes a locator for identifying the geographical location of the secure token.

77. A secure token according to claim 72, further including a display for displaying a current user balance or past transaction data.

78. A secure token for use in the communication device of claim 42, the secure token comprising:
    a token security component including a security code,
    a data storage component for storing user data, and
    a display for displaying a current user balance or past transaction data.

79. A method for accessing a communication system having an operations and resource component accessed by at least one communication device, the method comprising:

storing at the operations and resource component user function information including a plurality of software applications and data required to enable user access to a plurality of networks and user services;

storing at the operations and resource component security data associated with one or more secure tokens, the security data for each secure token including an access code;

interfacing a secure token with a communication device, wherein the secure token stores customized system function access data associated with an owner of the secure token;

entering a biometric reading into the communication device;

comparing the entered biometric reading with a biometric reading stored on the secure token;

when a match is detected between the entered biometric reading and the biometric reading stored on the secure token, transmitting an access code from the secure token to the operations and resource component via the communication device;

permitting user access to the communication system via the communication device when the access code from the secure token matches a corresponding security code associated with the secure token in the operations and resource component; and downloading to the communication device a customized subset of the stored user function information from the operations and resource component based upon the customized system function access data stored on the secure token, thereby enabling customized user access to software applications, networks and user services via the communication device, wherein the customized user access includes at least one of download of software requested by the user and access to software programs stored and running on at least one network via the user's communication device.

80. A secure universal transaction system for enabling entry, storage, editing, transmission of and access to user medical data, comprising:
an operations and resource component, including
a first biometric security component,
a second security component,
a communication component for enabling communication of medical data between the operations and resource component and at least one network,
a processor, and
a medical data storage component for storing medical data associated with one or more users;
a communication device for enabling a user to access and edit stored medical data associated with the user and to enter new user medical data via interaction with the operations and resource component, the communication device including
a token interface,
a biometric reader for enabling a user to input a biometric reading,
a communication component for enabling communication of the medical data associated with the user between the communication device and the operations and resource component,
a user input component for inputting user commands and information into the communication device and for enabling access to and editing of the stored medical data associated with the user and entry of the new user medical data associated with the user, wherein any new or edited user medical data input by the user is transmitted to the operations and resource component by the communication component of the communication device,
an output component for displaying the user medical data accessed, edited or entered by the user,
a processor, and
a data storage component; and
a secure token adapted to interface with the token interface of the communication device, including
a token security component for generating a security code, and
a data storage component for storing user identification data,
wherein user access to the medical data associated with the user that is stored in the operations and resource component is permitted only when the secure token is interfaced with the token interface of the communication device, the biometric reading entered by the user matches a biometric reading associated with the secure token in the biometric security component of the operations and resource component, and the security code generated by the token security component matches a corresponding security code associated with the secure token in the second security component of the operations and resource component,
wherein the user is provided with customized user access to medical data associated with the user via access to software applications, networks and user services via the communication device, wherein the customized user access includes access to data and software programs stored and running on at least one network via the user's communication device.

81. The system of claim 80, further comprising a medical provider communication device for enabling a provider of medical services to access and edit stored medical data associated with the user and enter new user medical data via secure interaction with the operations and resource component.

82. The system of claim 81, wherein different levels of access to the user medical data stored in the operations and resource component may be provided to different types of medical providers, and wherein a level of access granted to a selected medical provider may be defined by the user or by a system administrator.

83. A secure universal transaction system for enabling participation in gambling activities, including lotteries, comprising:
an operations and resource component, including
a first biometric security component,
a second security component,
a communication component for enabling user access to and participation in one or more gambling activities,
a processor, and
a data storage component;
a first communication device for enabling a user to participate in the one or more gambling activities via the operations and resource component, the first communication device including
a token interface,
a biometric reader for enabling a user to input a biometric reading,
a communication component for enabling communication between the first communication device and the operations and resource component, a user input component for inputting user commands and information into the first communication device, including gambling betting commands and lottery selections, an output component for providing information to the user, including data relating to the gambling activities, a processor, and a data storage component; and a secure token adapted to interface with the token interface of the first communication device, including a token security component for generating a security code, and a data storage component for storing user data, wherein user access to the gambling activities via the operations and resource component is permitted only when the secure token is interfaced with the token interface of the first communication device, the biometric reading entered by the user matches a biometric reading associated with the secure token in the biometric security component of the operations and resource component, and the security code generated by the token security component matches a corresponding security code associated with the secure token in the second security component of the operations and resource component, wherein the user is provided with customized user access to gambling activity data associated with the user via access to software applications, networks and user services via the communication device, wherein the customized user access includes access to data and software programs stored and running on at least one network via the user's communication device.

84. The system of claim 83, wherein each user's eligibility for access to the gambling activities is defined by a system administrator or by an administrator of the gambling activities.

85. The system of claim 83, further comprising:

a second communication device for enabling user access to the at least one network to participate in the one or more gambling activities via the operations and resource component, the second communication device including a token interface, a biometric reader for enabling a user to input a biometric reading, a communication component for enabling communication between the second communication device and the operations and resource component, a user input component for inputting user commands and information into the second communication device, including gambling betting commands and lottery selections, an output component for providing information to the user, including data relating to the gambling activities, a processor, and a data storage component;

wherein the first and second communication devices are configured to provide different user access levels to the gambling activities, and each access level has a defined fee structure payable by the user for participating in the gambling activities.

86. The system of claim 83, wherein winnings, other payouts, fees, losses, or other monetary amounts associated with the user's participation in the gambling activities are automatically deposited or withdrawn from one or more of the user's financial accounts.

* * * * *